US012317049B2

(12) United States Patent
Huang

(10) Patent No.: US 12,317,049 B2
(45) Date of Patent: May 27, 2025

(54) LOUDSPEAKER AND ASSEMBLY METHOD THEREFOR, VIBRATION MECHANISM, AND LOUDSPEAKER DEVICE

(71) Applicant: TANG BAND INDUSTRIES CO., LTD., Zhejiang (CN)

(72) Inventor: Hsin Min Huang, Ningbo (CN)

( * ) Notice: Subject to any disclaimer, the term of this patent is extended or adjusted under 35 U.S.C. 154(b) by 324 days.

(21) Appl. No.: 17/905,818

(22) PCT Filed: Mar. 23, 2021

(86) PCT No.: PCT/CN2021/082416
§ 371 (c)(1),
(2) Date: Sep. 7, 2022

(87) PCT Pub. No.: WO2021/190505
PCT Pub. Date: Sep. 30, 2021

(65) Prior Publication Data

US 2023/0156407 A1 May 18, 2023

(30) Foreign Application Priority Data

Mar. 23, 2020 (CN) ........................ 202010209085.X

(51) Int. Cl.

| | |
|---|---|
| ***H04R 9/06*** | (2006.01) |
| ***H04R 1/02*** | (2006.01) |
| ***H04R 7/12*** | (2006.01) |
| ***H04R 9/02*** | (2006.01) |
| ***H04R 9/04*** | (2006.01) |

(52) U.S. Cl.
CPC ............... *H04R 9/06* (2013.01); *H04R 1/021* (2013.01); *H04R 7/12* (2013.01); *H04R 9/025* (2013.01); *H04R 9/046* (2013.01); *H04R 2307/207* (2013.01)

(58) Field of Classification Search
CPC . H04R 9/06; H04R 1/021; H04R 7/12; H04R 9/025; H04R 9/046; H04R 2307/207; H04R 1/22; H04R 7/127; H04R 7/20; H04R 9/043; H04R 2209/024; H04R 31/00; H04R 9/02
See application file for complete search history.

(56) References Cited

U.S. PATENT DOCUMENTS

2015/0125024 A1* 5/2015 Espiritu .................. H04R 7/16
381/398

FOREIGN PATENT DOCUMENTS

| | | | |
|---|---|---|---|
| JP | H02890 U | * | 1/1990 |
| JP | 2010109665 A | * | 5/2010 |
| JP | 2011166193 A | * | 8/2011 |

* cited by examiner

*Primary Examiner* — Angelica M McKinney
(74) *Attorney, Agent, or Firm* — Tsz Lung Yeung

(57) ABSTRACT

A loudspeaker includes a magnetic circuit system, a paper cone, a suspension, a voice coil, and a frame; the magnetic circuit system is mounted at a frame low end of the frame; a suspension inner side and a suspension outer side of the suspension are respectively connected to a paper cone outer side of the paper cone and a frame high end of the frame; a voice coil high end of the voice coil is connected to a driven position of the paper cone; a voice coil low end of the voice coil and the magnetic circuit system are magnetically connected to each other; the driven position of the paper cone deviates from the center axis of the loudspeaker. Thus, when the loudspeaker is mounted in a housing to form a loudspeaker device, the effect of a diffraction problem on the loudspeaker device can be reduced or avoided.

14 Claims, 18 Drawing Sheets

LOUDSPEAKER AND ASSEMBLY METHOD THEREFOR, VIBRATION MECHANISM, AND LOUDSPEAKER DEVICE

BACKGROUND OF THE PRESENT INVENTION

Field of Invention

The present invention relates to the field of sound, and more particularly to a loudspeaker and assembly method thereof.

Description of Related Arts

FIGS. 1 to 3 show a loudspeaker 100P according to a prior art, the loudspeaker 100P includes a frame 10P, a magnetic circuit system 20P, a paper cone 30P, a suspension element 40P, and a voice coil 50P, wherein the magnetic circuit system 20P is mounted on a lower end portion 11P of the frame 10P, wherein outer and inner sides of the suspension element 40P are respectively extended to be connected to an upper end portion 12P of the frame 10P and an outer edge 31P of the paper cone 30P, so as to maintain the paper cone 30P on the upper end portion 12P of the frame 10P, wherein a voice coil lower end 51P of the voice coil 50P and the magnetic circuit system 20P are magnetically coupled with each other, wherein a voice coil upper end 52P of the voice coil 50P is connected to the center of the paper cone 30P. The loudspeaker 100P has a central axis 101P, wherein a central axis of the paper cone 30P, a central axis of the suspension element 40P and a central axis of the voice coil 50P all coincide with the central axis 101P of the loudspeaker 100P. In other words, the paper cone 30P is centrally symmetric with respect to the central axis 101P of the loudspeaker 100P, wherein the suspension element 40P is centrally symmetric with respect to the central axis 101P of the loudspeaker 100P, wherein the voice coil 50P is centrally symmetric with respect to the central axis 101P of the loudspeaker 100P. When the loudspeaker responds to the input of an audio signal, the magnetic circuit system 20P and the voice coil 50P interact with each other to drive the paper cone 30P to reciprocate along the central axis 101P of the loudspeaker 100P, so that the paper cone 30P can agitate air, so as to generate sound waves, wherein the suspension element 40P is used to limit the stroke of the paper cone 30P to ensure the movement direction of the paper cone 30P.

FIG. 4 and FIG. 5 show a loudspeaker device according to the prior art, wherein the loudspeaker device includes a cabinet 200P and the loudspeaker 100P mounted on the cabinet 200P. When designing the existing loudspeaker device, in order to ensure the aesthetics of the loudspeaker device, the loudspeaker 100P is installed along a center line of a front baffle 201P of the cabinet 200P, so that the distances from the central axis 101P of the loudspeaker 100P to two side edges of the front baffle 201P are exactly equal, which will cause loudspeaker device diffraction at the edge of the cabinet 200P and affect the sound quality of the loudspeaker device. In order to reduce or even avoid the diffraction problem, the loudspeaker devices in the prior art all adopt a method of designing a shape of the cabinet 200P, for example, the cabinet 200P is designed to be asymmetrical to avoid the distances from the central axis 101P of the loudspeaker 100P to the two side edges of the cabinet 200P being equal. This method not only requires the designer to have professional acoustic knowledge, but also causes the cabinet 200P to be unable to be designed into a regular shape. In detail, FIG. 6A shows a radiation state of a left reflected sound wave 1000P reflected by a left edge of the front baffle 201P of the cabinet 200P, wherein FIG. 6B shows a radiation state of a right side reflected sound wave 2000P reflected by a right edge of the plate 201P of the front baffle of the cabinet 200P, wherein FIG. 6C shows a radiation state of a composite sound wave 3000P formed after the left side reflected sound wave 1000P and the right side reflected sound wave 2000P encounter with each other. The peak of the left radiated sound wave 1000P appears at the same time with the peak of the right radiated sound wave 2000P, so the composite sound wave 3000P will suddenly overlap and seriously affect the sound quality of the loudspeaker device.

SUMMARY OF THE PRESENT INVENTION

The invention is advantageous in that it provides a loudspeaker and assembly method thereof, and vibration mechanism and loudspeaker device, wherein an induced position of a paper cone of the loudspeaker is deviated from a central axis of the loudspeaker, so that when the loudspeaker is installed to a front baffle of a cabinet, a loudspeaker device is formed by the cabinet and the loudspeaker, that can reduce or even avoid the sound diffraction problem and ensure the sound quality of the loudspeaker device.

Another advantage of the invention is to provide a loudspeaker and assembly method thereof, vibration mechanism and loudspeaker device, wherein the induced position of the paper cone of the loudspeaker is deviated from the central axis of the loudspeaker, so that the loudspeaker device according to the present invention can reduce or even avoid the sound diffraction problem without needing a special design of the cabinet, so that designers who are not familiar with or even have no knowledge of acoustic expertise can easily design and create the loudspeaker device with a good sound quality.

Another advantage of the invention is to provide a loudspeaker and assembly method thereof, vibration mechanism and loudspeaker device, wherein a connection position between a voice coil of the loudspeaker and a paper cone defines the induced position of the paper cone, and the voice coil is arranged to reciprocate along a moving axis of the loudspeaker, so as to induce the paper cone to reciprocate, wherein the moving axis of the loudspeaker deviates from the central axis of the loudspeaker.

Another advantage of the invention is to provide a loudspeaker and assembly method thereof, vibration mechanism and loudspeaker device, wherein the moving axis of the loudspeaker passes through a center of gravity of a paper cone, so that when the voice coil induces the paper cone to reciprocate along the moving axis, the paper cone can be kept in a horizontal state to avoid deflection, so as to ensure the sound quality of the loudspeaker.

Another advantage of the invention is to provide a loudspeaker and assembly method thereof, vibration mechanism and loudspeaker device, wherein the paper cone has an axis-near position and an axis-far position opposite to the axis-near position, wherein a thickness of the paper cone gradually becomes thinner from the axis-near position to the axis-far position, so that the moving axis of the loudspeaker passes through the center of gravity of the paper cone.

Another advantage of the invention is to provide a loudspeaker and assembly method thereof, vibration mechanism and loudspeaker device, wherein a thickness of the suspension element of the loudspeaker gradually becomes thinner from a position of the suspension element corresponding to the axis-near position of the paper cone toward the position of the suspension element corresponding to the axis-far position of the paper cone, so that the moving axis of the loudspeaker can pass through a center of gravity of a vibration mechanism formed by the paper cone and the suspension element, so that the paper cone can be induced to move while the paper cone is kept to be horizontal.

Another advantage of the present invention is to provide a loudspeaker and assembly method thereof, vibration mechanism and loudspeaker device, wherein a thickness of a glue layer for bonding the suspension element and the paper cone gradually becomes thinner from the axis-near position of the paper cone to the axis-far position of the paper cone, so that the moving axis of the loudspeaker can pass through the center of gravity of the vibration mechanism formed by the paper cone, the suspension element and the glue layer, so that the paper cone can be induced to move while the paper cone is kept to be horizontal.

According to one aspect of the present invention, the present invention provides a loudspeaker comprising:

a magnetic circuit system;

a paper cone having a paper cone outer side and an induced position;

a suspension element having a suspension element inner side and a suspension element outer side opposite to the suspension element inner side;

a voice coil having a voice coil lower end and a voice coil upper end opposite to the voice coil lower end; and a frame having a frame lower end and a frame upper end opposite to the frame lower end, wherein the magnetic circuit system is mounted to the frame lower end of the frame, wherein the suspension element inner side of the suspension element is extended inward to be connected to the paper cone outer side of the paper cone, wherein the suspension element outer side of the suspension element is extended outward to be connected to the frame upper end of the frame, wherein the voice coil upper end is connected to the induced position of the paper cone, wherein the voice coil lower end of the voice coil and the magnetic circuit system are magnetically coupled with each other, wherein the induced position of the paper cone deviates from a central axis of the loudspeaker.

According to an embodiment of the present invention, the paper cone has an axis-near position and an axis-far position opposite to the axis-near position, wherein a thickness of the paper cone gradually becomes thinner from the axis-near position to the axis-far position.

According to an embodiment of the present invention, the paper cone has an axis-near position and an axis-far position opposite to the axis-near position, wherein a thickness of the suspension element gradually becomes thinner from a position of the suspension element corresponding to the axis-near position to another position of the suspension element corresponding to the axis-far position.

According to an embodiment of the present invention, the loudspeaker further comprises a glue layer attaching the suspension element inner side of the suspension element to the paper cone outer side of the paper cone, wherein a thickness of the glue layer gradually becomes thinner from the axis-near position of the paper cone to the axis-far position of the paper cone.

According to an embodiment of the present invention, the paper cone has an axis-near position and an axis-far position opposite to the axis-near position, wherein a thickness of the paper cone gradually becomes thinner from the axis-near position to the axis-far position, wherein a thickness of the suspension element gradually becomes thinner from a position of the suspension element corresponding to the axis-near position to another position of the suspension element corresponding to the axis-far position.

According to an embodiment of the present invention, the paper cone and the suspension element are integrally formed.

According to an embodiment of the present invention, the frame comprises a lower end frame and an upper end frame mounted to the lower end frame, wherein the lower end frame further comprises a magnetic circuit mounting ring, an engaging ring, and a plurality of connecting arms spacedly extended between the magnetic circuit mounting ring and the engaging ring, wherein a central axis of the magnetic circuit system and a central axis of the engaging ring deviate from each other, wherein the magnetic circuit system is mounted to the magnetic circuit mounting ring, wherein the upper end frame comprises a retaining ring and at least two engaging arms extended downward from the retaining ring, wherein the suspension element outer side of the suspension element is connected to the retaining ring of the upper end frame, wherein the at least two engaging arms of the upper end frame is mounted to the engaging ring of the lower end frame, wherein a central axis of the retaining ring and the central axis of the engaging ring coincide with each other.

According to an embodiment of the present invention, the loudspeaker further comprises an axis stabling element, wherein the axis stabling element has an axis stabling element inner side and an axis stabling element outer side opposite to the axis stabling element inner side, wherein the axis stabling element inner side of the axis stabling element is connected to the voice coil, wherein the axis stabling element outer side of the axis stabling element is connected to the frame.

According to an embodiment of the present invention, a shape of the paper cone is one of a horn-like structure and a flat plate-like structure.

According to another aspect of the present invention, the present invention further provides a loudspeaker device comprising a cabinet and a loudspeaker, wherein the cabinet comprises a front baffle, wherein the loudspeaker is mounted to the front baffle of the cabinet, wherein the loudspeaker comprises:

a magnetic circuit system;

a paper cone having a paper cone outer side and an induced position;

a suspension element having a suspension element inner side and a suspension element outer side opposite to the suspension element inner side;

a voice coil having a voice coil lower end and a voice coil upper end opposite to the voice coil lower end; and a frame having a frame lower end and a frame upper end opposite to the frame lower end, wherein the magnetic circuit system is mounted to the frame lower end of the frame, wherein the suspension element inner side of the suspension element is extended inward to be connected to the paper cone outer side of the paper cone, wherein the suspension element outer side of the suspension element is extended outward to be connected to the frame upper end of the frame, wherein the voice coil upper end is connected to the induced position of the paper cone, wherein the voice coil lower end of the voice coil and the magnetic circuit system connect with each other in such a manner that the voice coil lower end of the voice coil and the magnetic circuit system magnetically interact with each other, wherein the induced position of the paper cone deviate to a central axis of the loudspeaker.

According to an embodiment of the present invention, the paper cone has an axis-near position and an axis-far position opposite to the axis-near position, wherein a thickness of the paper cone gradually becomes thinner from the axis-near position to the axis-far position.

According to an embodiment of the present invention, the paper cone has an axis-near position and an axis-far position opposite to the axis-near position, wherein a thickness of the suspension element gradually becomes thinner from a position of the suspension element corresponding to the axis-near position to another position of the suspension element corresponding to the axis-far position.

According to an embodiment of the present invention, the loudspeaker further comprises a glue layer attaching the suspension element inner side of the suspension element to the paper cone outer side of the paper cone, wherein a thickness of the glue layer gradually becomes thinner from the axis-near position of the paper cone to the axis-far position of the paper cone.

According to an embodiment of the present invention, the paper cone has an axis-near position and an axis-far position opposite to the axis-near position, wherein a thickness of the paper cone gradually becomes thinner from the axis-near position to the axis-far position, wherein a thickness of the suspension element gradually becomes thinner from a position of the suspension element corresponding to the axis-near position to another position of the suspension element corresponding to the axis-far position.

According to an embodiment of the present invention, the paper cone and the suspension element are integrally formed.

According to an embodiment of the present invention, the frame comprises a lower end frame and an upper end frame mounted to the lower end frame, wherein the lower end frame further comprises a magnetic circuit mounting ring, an engaging ring, and a plurality of connecting arms spacedly extended between the magnetic circuit mounting ring and the engaging ring, wherein a central axis of the magnetic circuit system and a central axis of the engaging ring deviate from each other, wherein the magnetic circuit system is mounted to the magnetic circuit mounting ring, wherein the upper end frame comprises a retaining ring and at least two engaging arms extended downward from the retaining ring, wherein the suspension element outer side of the suspension element is connected to the retaining ring of the upper end frame, wherein the at least two engaging arms of the upper end frame is mounted to the engaging ring of the lower end frame, wherein a central axis of the retaining ring and the central axis of the engaging ring coincide with each other.

According to an embodiment of the present invention, the loudspeaker further comprises an axis stabling element, wherein the axis stabling element has an axis stabling element inner side and an axis stabling element outer side opposite to the axis stabling element inner side, wherein the axis stabling element inner side of the axis stabling element is connected to the voice coil, wherein the axis stabling element outer side of the axis stabling element is connected to the frame.

According to an embodiment of the present invention, a shape of the paper cone is one of a horn-like structure and a flat plate-like structure.

According to another aspect of the present invention, the present invention further provides a method for assembling a loudspeaker, comprising the following steps:

(a) installing a magnetic circuit system to a magnetic circuit mounting ring of a lower end frame in such a manner that a central axis of the magnetic circuit system deviates from a central axis of an engaging ring of the lower end frame;

(b) allowing a suspension element inner side and a suspension element outer side of a suspension element to be connected to a paper cone outer side of a paper cone and a retaining ring of an upper end frame respectively; and (c) installing the upper end frame to the lower end frame in such a manner that a central axis of the retaining ring and a central axis of the engaging ring coincide with each other, so as to allow a voice coil which is connected to an induced position of the paper cone to be extended toward the magnetic circuit system and is magnetically coupled to the magnetic circuit system, and the induced position of the paper cone is deviated from a central axis of the loudspeaker, so as to assemble the loudspeaker.

According to an embodiment of the present invention, the step (b) further comprises the following steps:

forming the paper cone by injection molding, wherein a thickness of the paper cone gradually becomes thinner from an axis-near position to an axis-far position of the paper cone; and integrally forming the suspension element between the paper cone and the retaining ring of the upper end frame.

According to an embodiment of the present invention, the step (b) further comprises a following step: integrally forming the suspension element between the paper cone and the retaining ring of the upper end frame, wherein a thickness of the suspension element is gradually thinner from a position corresponding to an axis-near position of the paper cone to another position corresponding to an axis-far position of the paper cone.

According to an embodiment of the present invention, the step (b) further comprises the following steps:

applying a first glue to the suspension element inner side of the suspension element and/or the paper cone outer side of the paper cone, so as to bond the suspension element inner side of the suspension element to the paper cone outer side of the paper cone, wherein a thickness of a first glue layer retained between the paper cone outer side of the paper cone and the suspension element inner side of the suspension element gradually becomes thinner from an axis-near position to an axis-far position of the paper cone; and applying a second glue to the suspension element outer side of the suspension element and/or the retaining ring of the upper end frame, so as to bond the suspension element outer side of the suspension element to the retaining ring of the upper end frame.

According to an embodiment of the present invention, the step (b) further comprises a following step: integrally forming the paper cone and the suspension element by injection molding, wherein the suspension element outer side of the suspension element is integrally connected to the retaining ring of the upper end frame, wherein a thickness of the paper cone gradually becomes thinner from an axis-near position to an axis-far position of the paper cone, wherein a thickness of the suspension element gradually becomes thinner from a position corresponding to the axis-near position of the paper cone to another position corresponding to the axis-far position of the paper cone.

According to another aspect of the present invention, the present invention further provides a vibration mechanism, comprising:

a suspension element having a suspension element inner side and a suspension element outer side opposite to the suspension element inner side; and a paper cone having a paper cone outer side and an induced position, wherein the suspension element inner side of the suspension element connects to the paper cone outer side of the paper cone, wherein the induced position of the paper cone deviates from a central axis of the paper cone.

According to an embodiment of the present invention, the paper cone has an axis-near position and an axis-far position opposite to the axis-near position, wherein the induced position of the paper cone is close to the axis-near position and away from the axis-far position.

According to an embodiment of the present invention, a center of gravity of the vibration mechanism is close to the axis-near position of the paper cone and away from the axis-far position of the paper cone.

According to an embodiment of the present invention, a thickness of the paper cone gradually becomes thinner from the axis-near position to the axis-far position.

According to an embodiment of the present invention, a thickness of the suspension element gradually becomes thinner from a position of the suspension element corresponding to the axis-near position to another position of the suspension element corresponding to the axis-far position.

According to an embodiment of the present invention, a thickness of the paper cone gradually becomes thinner from the axis-near position to the axis-far position, wherein a thickness of the suspension element gradually becomes thinner from a position of the suspension element corresponding to the axis-near position to another position of the suspension element corresponding to the axis-far position.

According to an embodiment of the present invention, the paper cone and the suspension element are integrally formed.

According to an embodiment of the present invention, the vibration mechanism further comprises a glue layer attaching the suspension element to the paper cone, wherein the glue layer is provided between the suspension element inner side of the suspension element and the paper cone outer side of the paper cone, wherein a thickness of the glue layer gradually becomes thinner from the axis-near position of the paper cone to the axis-far position of the paper cone.

According to an embodiment of the present invention, a shape of the paper cone is one of a horn-like structure and a flat plate-like structure.

DETAILED DESCRIPTION OF THE PREFERRED EMBODIMENT

Figure 1:
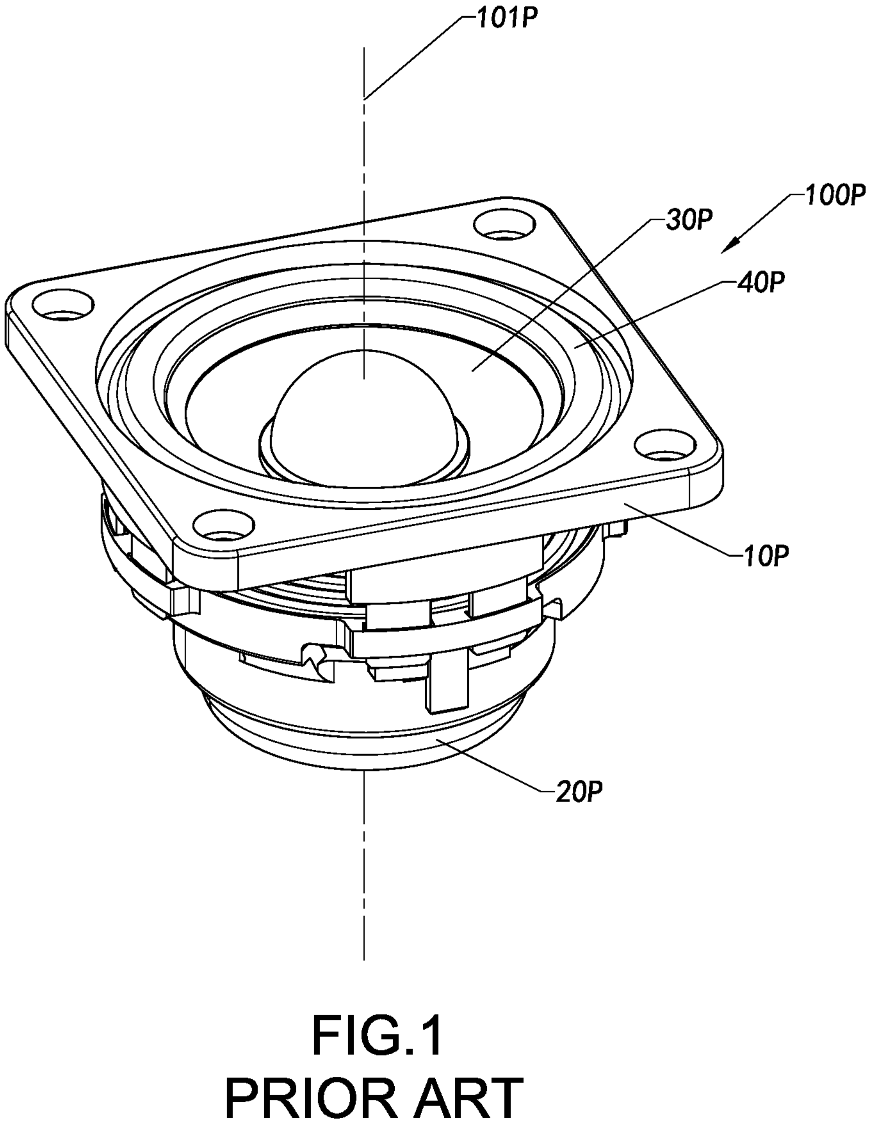
FIG.1 PRIOR ART
FIG. 1 is a perspective view of a loudspeaker according to a prior art.
Figure 2:
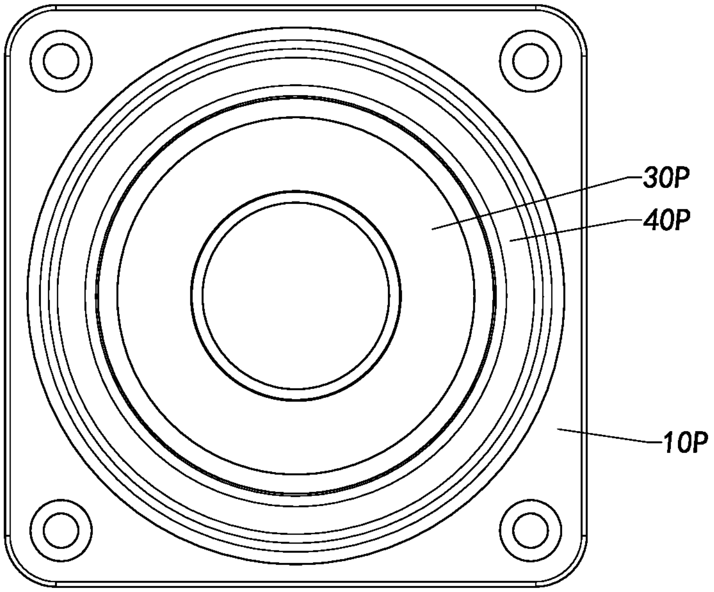
FIG.2 PRIOR ART
FIG. 2 is a top view of the loudspeaker according to the above prior art.
Figure 3:
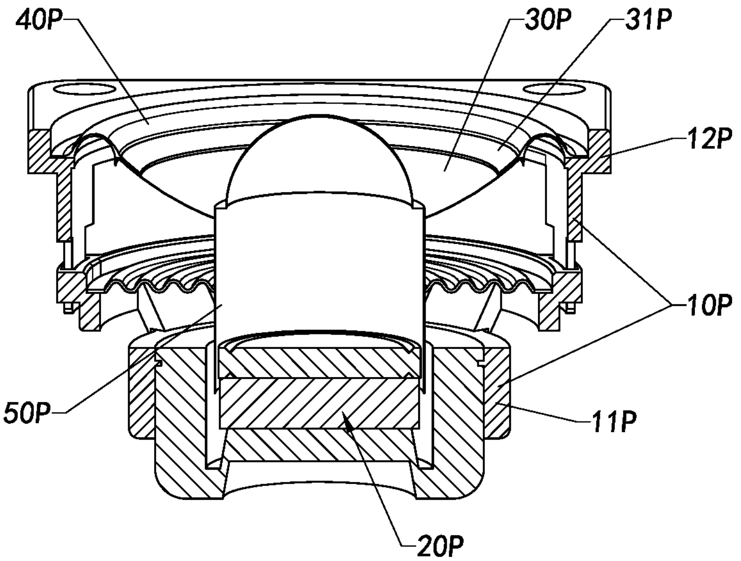
FIG.3 PRIOR ART
FIG. 3 is a sectional view of the loudspeaker according to the above prior art.
Figure 4:
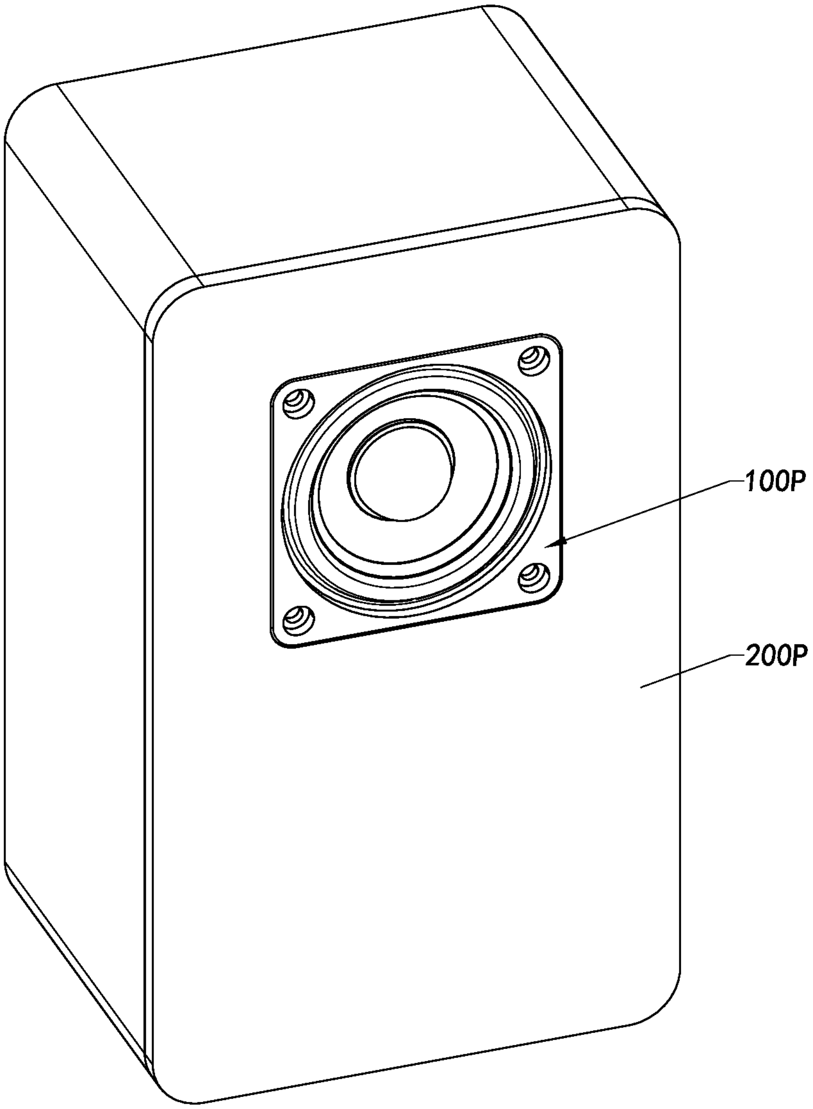
FIG.4 PRIOR ART
FIG. 4 is a perspective view of a loudspeaker device according to a prior art, wherein the loudspeaker device is incorporated with the loudspeaker illustrated in FIG. 1 to FIG. 3.
Figure 5:
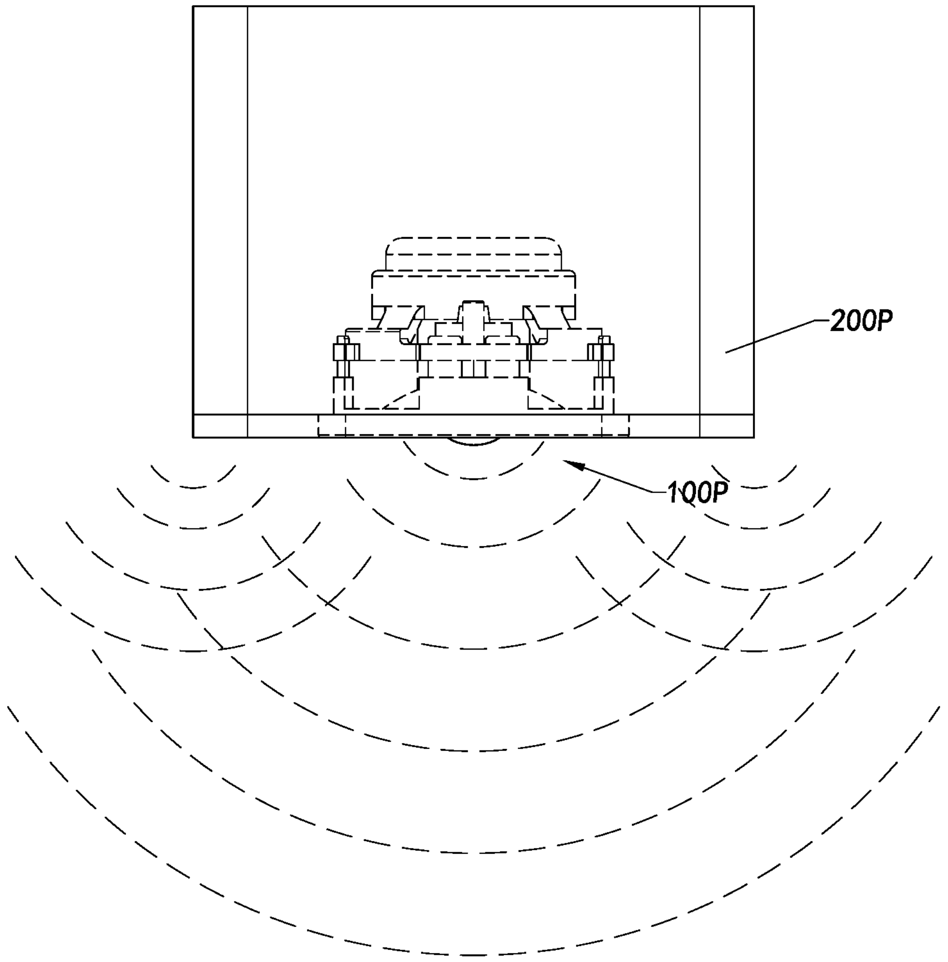
FIG.5 PRIOR ART
FIG. 5 is a schematic diagram illustrating the sound wave radiation state of the loudspeaker device in the prior art when sound is emitted.
Figure 6A:
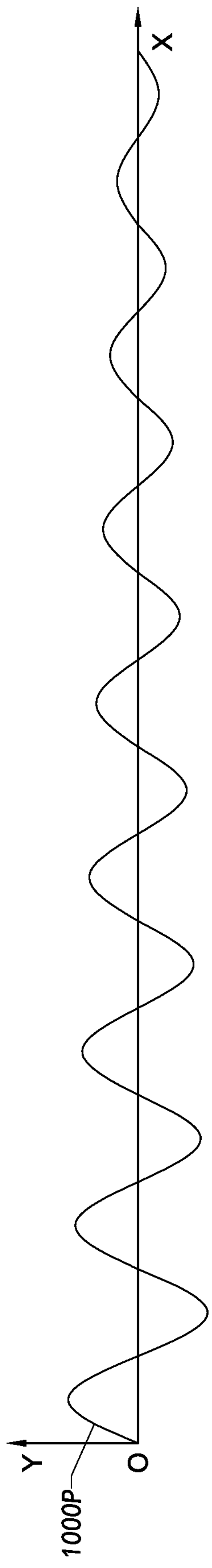
FIG.6A PRIOR ART
FIGS. 6A to 6C illustrate sound wave radiation states of the loudspeaker device according to the prior art.
Figure 6B:
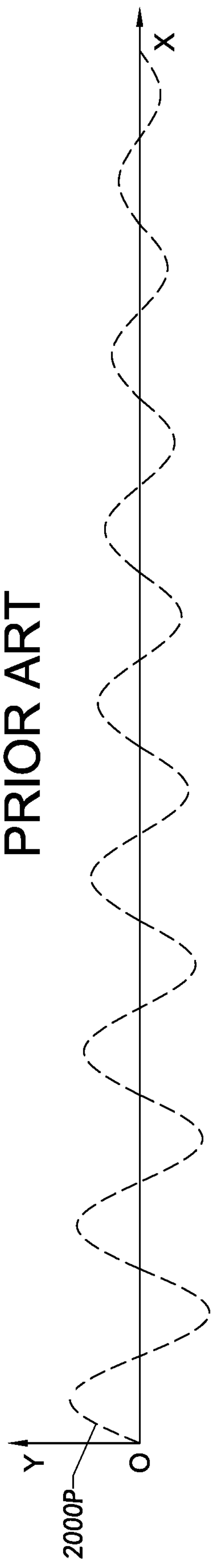
FIG.6B PRIOR ART
Figure 6C:
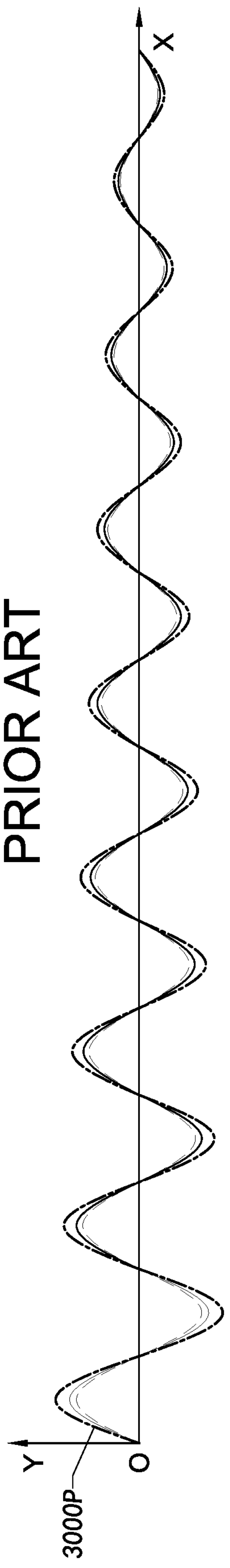
FIG.6C PRIOR ART

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above terminologies shall not be interpreted as confine to the present invention.

It should be understood that the term "a" should be understood as "at least one" or "one or more". In other words, in one embodiment, the number of an element may be one, and in another embodiment, the number of the element may be plural. The term "one" should not be understood as a limitation on the number.

Referring to FIGS. 7A to 9 of the drawings, a loudspeaker 100 according to a preferred embodiment of the present invention is disclosed and explained in the following description, wherein the loudspeaker 100 comprises a frame 10, a magnetic circuit system 20, a suspension element 30, a paper cone 40 and a voice coil 50.

The frame 10 has a frame lower end 11 and a frame upper end 12 opposite to the frame lower end 11.

The magnetic circuit system 20 has a magnetic gap 21 and a magnetic gap opening 22 communicating with the magnetic gap 21, wherein the magnetic circuit system 20 is mounted on the frame lower end 11 of the frame 10, and the magnetic gap opening 22 of the magnetic circuit system 20 faces to the frame upper end 12 of the frame 10.

The paper cone 40 has a paper cone outer side 41. The suspension element 30 has a suspension element inner side 31 and a suspension element outer side 32 opposite to the suspension element inner side 31, wherein the suspension element inner side 31 of the suspension element 30 is extended inward, so as to be connected to the paper cone outer side 41 of the paper cone 40. The suspension element outer side 32 of the suspension element 30 is extended outward, so as to be connected to the frame upper end 12 of the frame 10, so that the paper cone 40 is held to the frame upper end 12 of the frame 10 with the help of the suspension element 30.

The voice coil 50 has a voice coil lower end 51 and a voice coil upper end 52 opposite to the voice coil lower end 51, wherein the voice coil lower end 51 of the voice coil 50 passes through the magnetic gap opening 22 of the magnetic circuit system 20 and is extended into the magnetic gap 21 of the magnetic circuit system 20, and the voice coil lower end 51 of the voice coil 50 is movably held in the magnetic gap 21 of the magnetic circuit system 20. The voice coil lower end 51 of the voice coil 50 and the magnetic circuit system 20 are magnetically coupled with each other, so that the voice coil lower end 51 of the voice coil 50 and the magnetic circuit system 20 can interact with each other. Accordingly, the voice coil upper end 52 of the voice coil 50 is extended to and connected to the paper cone 40, so as to define an induced position 42 of the paper cone 40. The induced position 42 of the paper cone 40 deviates from a central axis 101 of the loudspeaker 100. A moving axis 102 of the loudspeaker 100 passes through the induced position 42 of the paper cone 40. In other words, the moving axis 102 of the loudspeaker 100 deviates from the central axis 101.

When the loudspeaker 100 responds to the input of an audio signal, the magnetic circuit system 20 and the voice coil lower end 51 of the voice coil 50 magnetically interact with each other, so as to allow the magnetic circuit system 20 to induce the paper cone 40 reciprocate along the moving axis 102 of the loudspeaker 100 through the voice coil 50 which drives the paper cone 40 at the induced position 42 of the paper cone 40, so as to agitate the air to outwardly radiate sound waves, wherein the suspension element 30 limits the stroke of the paper cone 40 and ensures that the paper cone 40 reciprocates along the moving axis 102 of the loudspeaker 100.

Preferably, the moving axis 102 of the loudspeaker 100 passes through the center of gravity of the paper cone 40, so that when the voice coil 50 drives the paper cone 40 at the induced position 42 of the paper cone 40, the paper cone 40 reciprocates along the moving axis 102 of the loudspeaker 100, and the paper cone 40 is capable of being retained horizontal, so as to avoid deviation, so as to ensure the sound quality of the loudspeaker 100.

Referring to FIG. 7A to FIG. 9, in the loudspeaker 100 according to this preferred embodiment of the present invention, the paper cone 40 has an axis-near position 43 and an axis-far position 44 opposite to the axis-near position 43, wherein the axis-near position 43 of the paper cone 40 refers to an edge position of the paper cone outer side 41 of the paper cone 40 that is closest to the moving axis 102 of the loudspeaker 100. The axis-far position 44 refers to the edge position of the outer side 41 of the paper cone 40 that is farthest from the moving axis 102 of the loudspeaker 100. In the loudspeaker 100 according to this preferred embodiment of the present invention, the thickness of the paper cone 40 gradually becomes thinner from the axis-near position 43 to the axis-far position 44, so that the center of gravity of the paper cone 40 is close to the axis-near position 44 and far from the axis-far position 43, so that the moving axis 102 of the loudspeaker 100 passes through the center of gravity of the paper cone 40. Hence, when the voice coil 50 drives the paper cone 40 to reciprocate along the moving axis 102 of the loudspeaker 100, the paper cone 40 is retained horizontal, so as to avoid tilting, so as to ensure the sound quality of the loudspeaker 100.

Furthermore, referring to FIG. 7A to FIG. 9, the frame 10 comprises a lower end frame 13 and a upper end frame 14 mounted on the lower end frame 13, wherein the lower end frame 13 forms the frame lower end 11 of the frame 10. The magnetic circuit system 20 is mounted on the lower end frame 13, so that the magnetic circuit system 20 is held at the frame lower end 11. Correspondingly, the upper end frame 14 forms the frame upper end 12 of the frame 10. The suspension element outer side 32 of the suspension element 30 is connected to the upper end frame 14, so that the paper cone 40 connected with the suspension element 30 is held to the frame upper end 12.

Figure 7A:
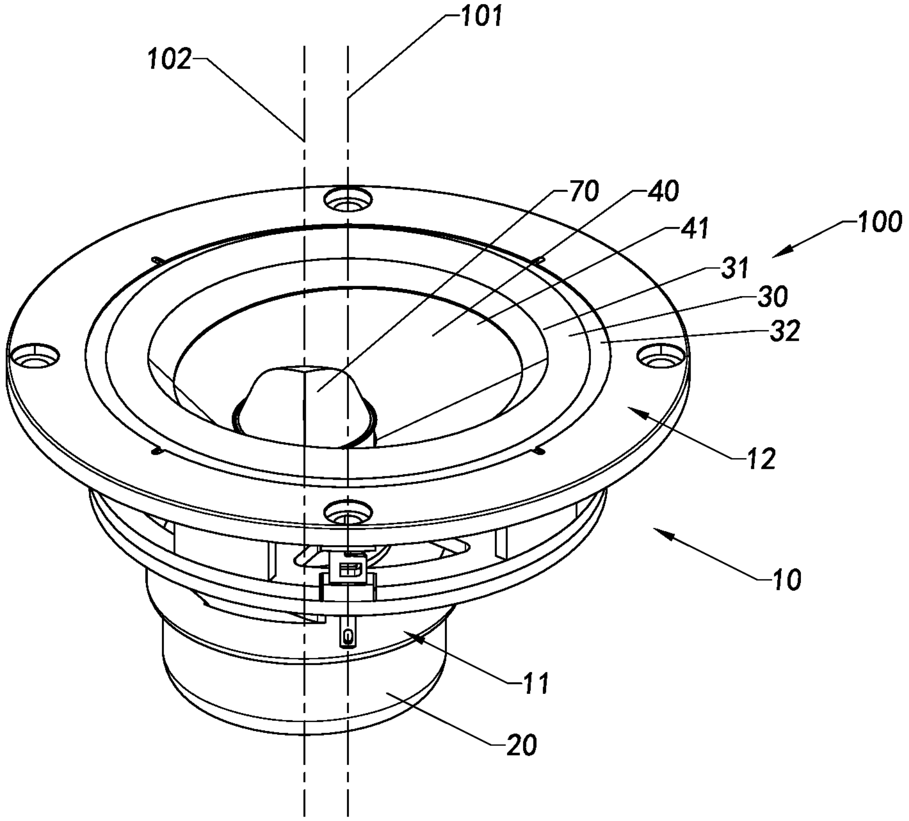
FIG. 7A is a perspective view of a loudspeaker according to a preferred embodiment of the present invention.
Figure 7B:
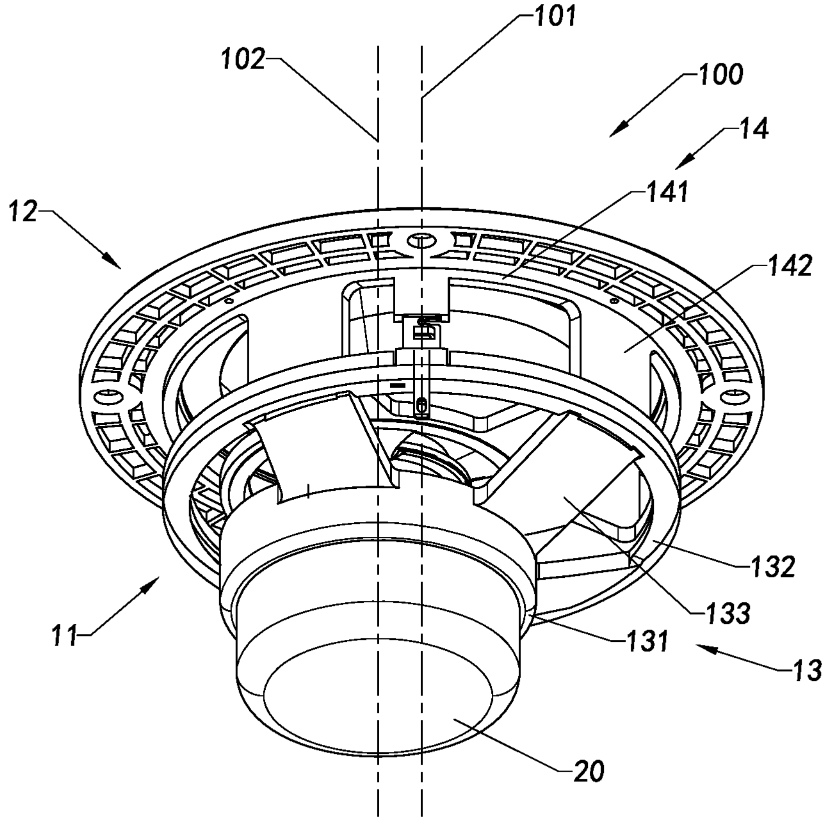
FIG. 7B is another perspective view of the loudspeaker according to the above preferred embodiment of the present invention.
Figure 8:
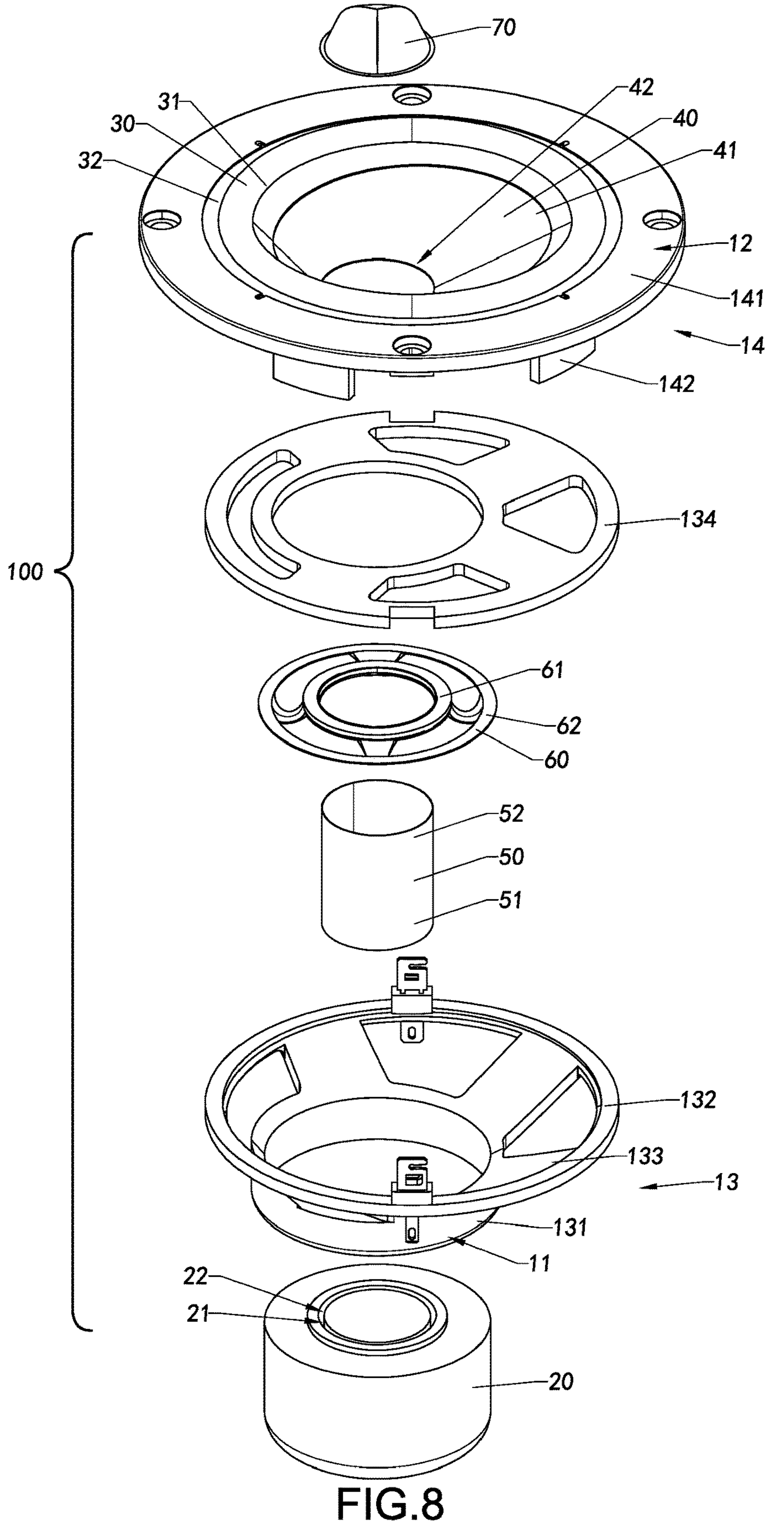
FIG. 8 is an exploded view of the loudspeaker according to the above preferred embodiment of the present invention.
Figure 9:
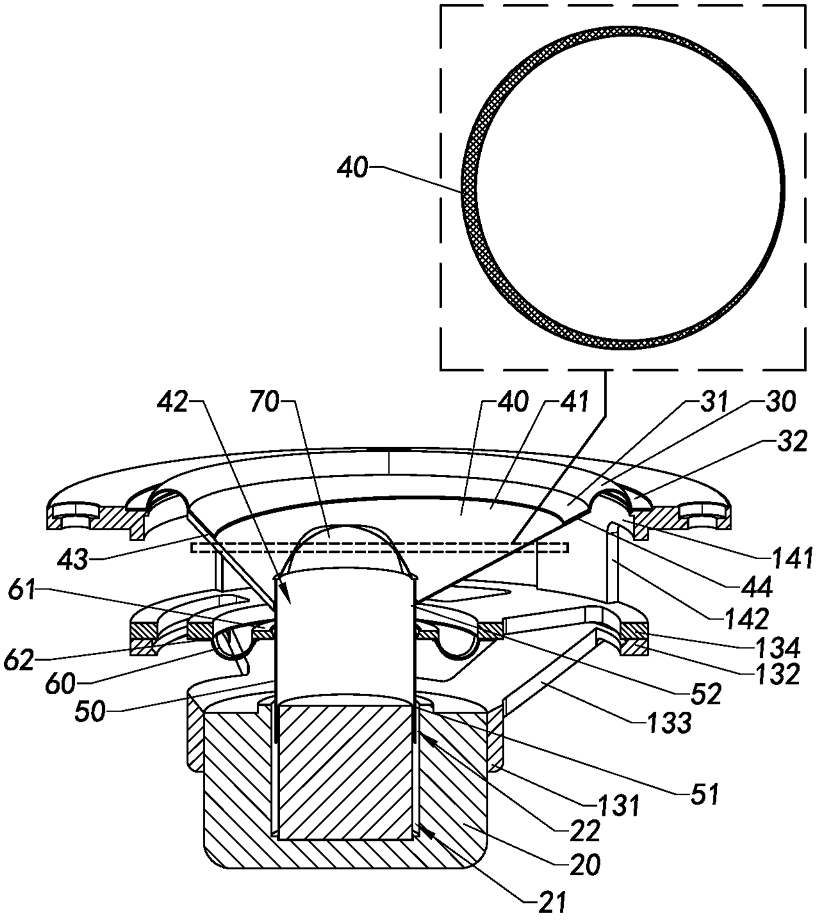
FIG. 9 is a cross-sectional view of the loudspeaker according to the above preferred embodiment of the present invention.

In more details, referring to FIGS. 7B and 8, the lower end frame 13 further comprises a magnetic circuit mounting ring 131, an engaging ring 132, and a plurality of connecting arms 133 extended between the magnetic circuit mounting ring 131 and the engaging ring 132. The magnetic circuit mounting ring 131 of the lower end frame 13 is mounted to the magnetic circuit system 20 in such a manner that the magnetic circuit mounting ring 131 surrounds the outer side of the magnetic circuit system 20, so that the magnetic circuit system 20 is mounted to the lower frame 13. The central axis of the magnetic circuit mounting ring 131 and the central axis of the engaging ring 132 are deviated from each other and are not coincided with each other, so that the central axis of the magnetic circuit system 20 mounted on the magnetic circuit mounting ring 131 and the center axis of the engaging rings 132 are deviated from each other, and thus they are not coincided with each other.

Correspondingly, the upper end frame 14 comprises a retaining ring 141 and at least two engaging arms 142 extended downward from the retaining ring 141, wherein the suspension element outer side 32 of the suspension element 30 is connected to the retaining ring 141 of the upper end frame 14, so as to allow the retaining ring 141 to surround the paper cone 40. The engaging arms 142 of the upper end frame 14 are mounted to the engaging ring 132 of the lower end frame 13. The central axis of the retaining ring 141 of the upper end frame 14 and the central axis of the engaging ring 132 coincide with each other, so that the central axis of the magnetic circuit system 20 and the central axis of the retaining ring 141 deviate from each other, and thus they are not coincided with each other.

It is worth mentioning that, in the loudspeaker 100 according to this preferred embodiment of the present invention, the central axis of the retaining ring 141 of the upper end frame 14 and the central axis of the engaging ring 132 of the lower end frame 13 defines the central axis 101 of the loudspeaker 100. The central axis 101 of the loudspeaker 100, the central axis of the retaining ring 141 of the upper end frame 14, and the central axis of the engaging ring 132 of the lower end frame 13 coincide with each other. Correspondingly, the central axis of the magnetic circuit system 20 defines the moving axis 102 of the loudspeaker 100, and the moving axis 102 of the loudspeaker 100 and the central axis of the magnetic circuit system 20 coincide with each other. In the loudspeaker 100 according to this preferred embodiment of the present invention, the central axis of the magnetic circuit system 20 is deviated from the central axis of the retaining ring 141 of the upper end frame 14 and the central axis of the engaging ring 132 of the lower end frame 13, so that the moving axis 102 of the loudspeaker 100 deviates from the central axis 101 of the loudspeaker 100.

Referring to FIGS. 7A to 9, in the loudspeaker 100 according to this preferred embodiment of the present invention, the paper cone 40 can be formed by injection molding, so that the thickness of the paper cone 40 can gradually becomes thinner from the axis-near position 43 to the axis-far position 44. The forming method of the suspension element 30 is not limited in the present invention. For example, according to an embodiment of the present invention, the suspension element 30 is prefabricated, wherein the suspension element inner side 31 of the suspension element 30 can be attached to the paper cone outer side 41 of the paper cone 40 by an adhesive substance such as a glue. Correspondingly, the suspension element outer side 32 of the suspension element 30 can be attached to the retaining ring 141 of the upper end frame 14 by an adhesive substance such as a glue. According to another embodiment of the present invention, the suspension element 30 is integrally formed between the paper cone 40 and the retaining ring 141 of the upper end frame 14, so that the suspension element inner side 31 of the suspension element 30 is integrally connected to the paper cone outer side 41 of the paper cone 40 during the forming process of the suspension element 30, and the suspension element outer side 32 of the suspension element 30 is integrally connected to the retaining ring 141 of the upper end frame 14 during the forming process of the suspension element 30.

Continuing to refer to FIG. 7A to FIG. 9, the loudspeaker 100 further comprises an axis stabling element 60, wherein the axis stabling element 60 has an axis stabling element inner side 61 and an axis stabling element outer side 62 opposite to the axis stabling element inner side 61, wherein the axis stabling element inner side 61 of the axis stabling element 60 is extended to and connected to the voice coil 50, wherein the axis stabling element outer side 62 of the axis stabling element 60 is extended to and connected to the frame 10, wherein when the magnetic circuit system 20 induces the voice coil 50 to reciprocate along the moving axis 102 of the loudspeaker 100, the voice coil 50 can drive the axis stabling element 60 to deform, so as to restrict the reciprocating direction of the voice coil 50 with the help of the axis stabling element 60, and further prevent the moving direction of the voice coil 50 from deviating from the moving axis 102 of the loudspeaker 100.

Furthermore, the lower end frame 13 comprises an engaging platform 134, wherein the engaging platform 134 is extended inward from the engaging ring 132, wherein the axis stabling element outer side 62 of the axis stabling element 60 is connected to the engaging platform 134 of the lower end frame 13 end.

It is worth mentioning that the shape of the axis stabling element 60 is not limited in the present invention. For example, in the embodiment shown in FIGS. 7A to 9, the axis stabling element 60 can be designed to have a shape similar to the suspension element 30. In other words, the axis stabling element 60 may have a cross-sectional shape of a "U", or the axis stabling element 60 may have a cross-sectional shape of an "S", or the axis stabling element 60 may have a cross-sectional shape of a wave, and according to other embodiments of the present invention, the axis stabling element 60 may be a spider.

Continuing to refer to FIGS. 7A to 9, the loudspeaker 100 further comprises a dust cap 70, wherein the dust cap 70 is installed on the voice coil upper end 52 of the voice coil 50 for sealing the upper end opening of the voice coil 50, so as to prevent dust from entering the interior of the voice coil 50. The shape of the dust cap 70 is not limited in the present invention, and it may be a hemispherical structure or a flat plate structure.

Figure 10:
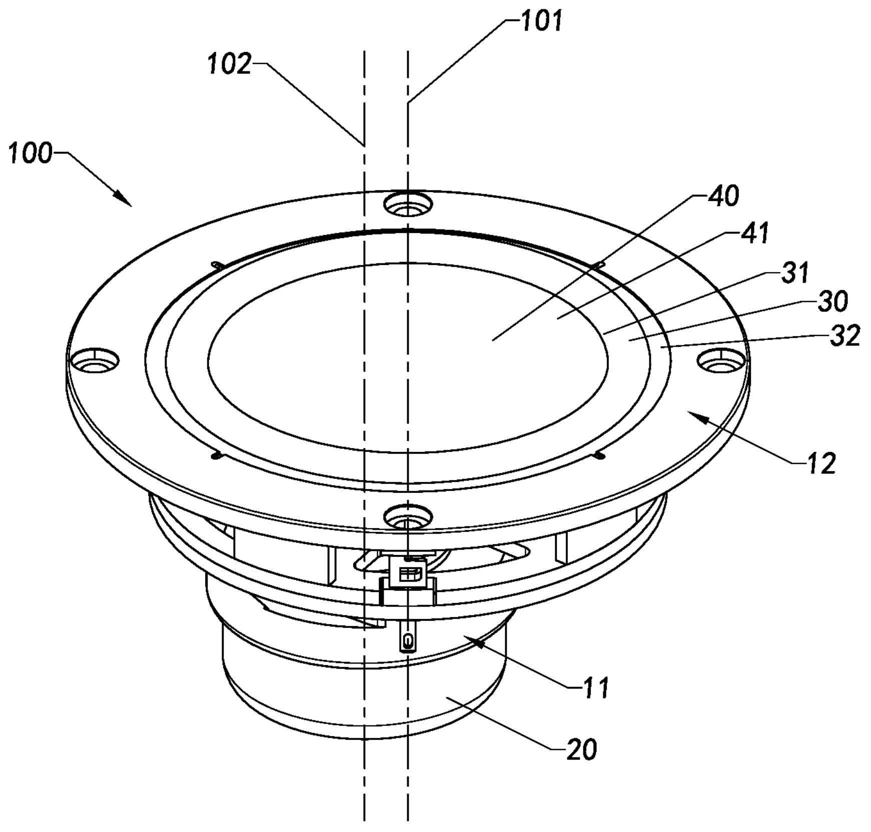
FIG. 10 is a perspective view of a loudspeaker according to a first modified mode of the above preferred embodiment of the present invention.
Figure 11:
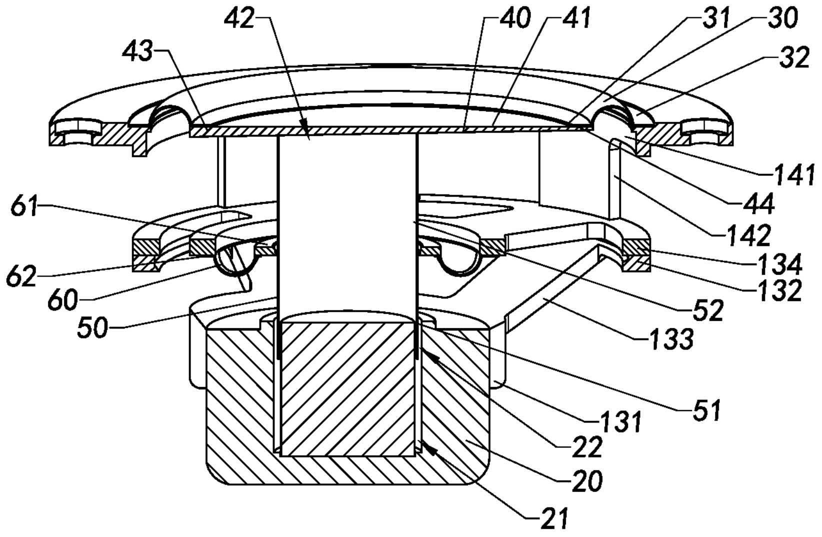
FIG. 11 is a cross-sectional view of the loudspeaker according to the above first modified mode of the above preferred embodiment of the present invention.

It is worth mentioning that the shape of the paper cone 40 is not limited in the present invention. For example, in the embodiment shown in FIGS. 7A to 9, the paper cone 40 has a horn-like structure, and in a loudspeaker 100 according to a first modified mode of the above preferred embodiment of the present invention, a paper cone 40 has a flat plate-like structure, as shown in FIGS. 10 and 11.

Figure 12:
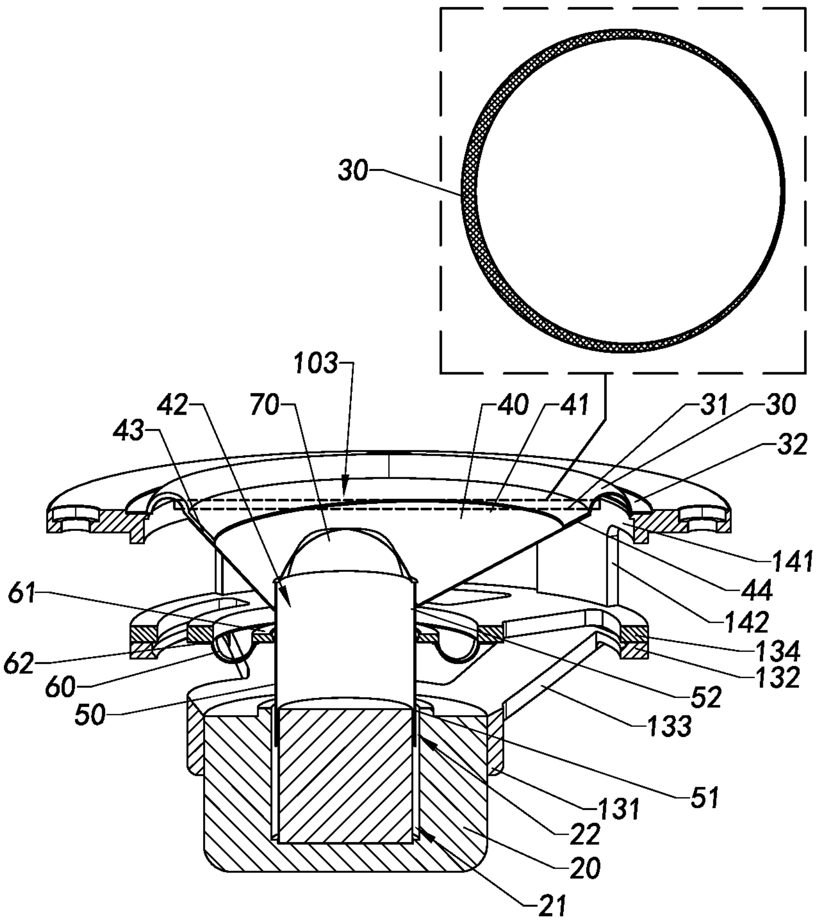
FIG. 12 is a cross-sectional view of a loudspeaker according to a second modified mode of the above preferred embodiment of the present invention.

FIG. 12 shows a loudspeaker 100B according to a second modified mode of the above preferred embodiment of the present invention. What is different from the loudspeaker 100 shown in FIGS. 7A to 9, in the loudspeaker 100 shown in FIG. 12, the thickness of a paper cone 40 at each position is the same, wherein the thickness of a suspension element 30 is gradually thinner from the position corresponding to an axis-near position 43 of the paper cone 40 to the position of the suspension element 30 corresponding to the axis-far position 44 of the paper cone 40, so that the center of gravity of a vibration mechanism 103 formed by the suspension element 30 and the paper cone 40 is close to the axis-near position 43 of the paper cone 40, and is far from the axis-far position 44, so that a moving axis 102 of the loudspeaker 100 can pass through a center position of the vibration mechanism 103. Hence, when the voice coil 50 drives the paper cone 40 to reciprocate along the moving axis 102 of the loudspeaker 100, the paper cone 40 can be kept horizontal and avoid tilting, so as to ensure the sound quality of the loudspeaker 100.

It is worth mentioning that, according to the present invention shown in FIG. 12, the paper cone 40 can be made by injection molding process, or can be made by bending a flat structure and bonding the free end of the flat structure.

Figure 13:
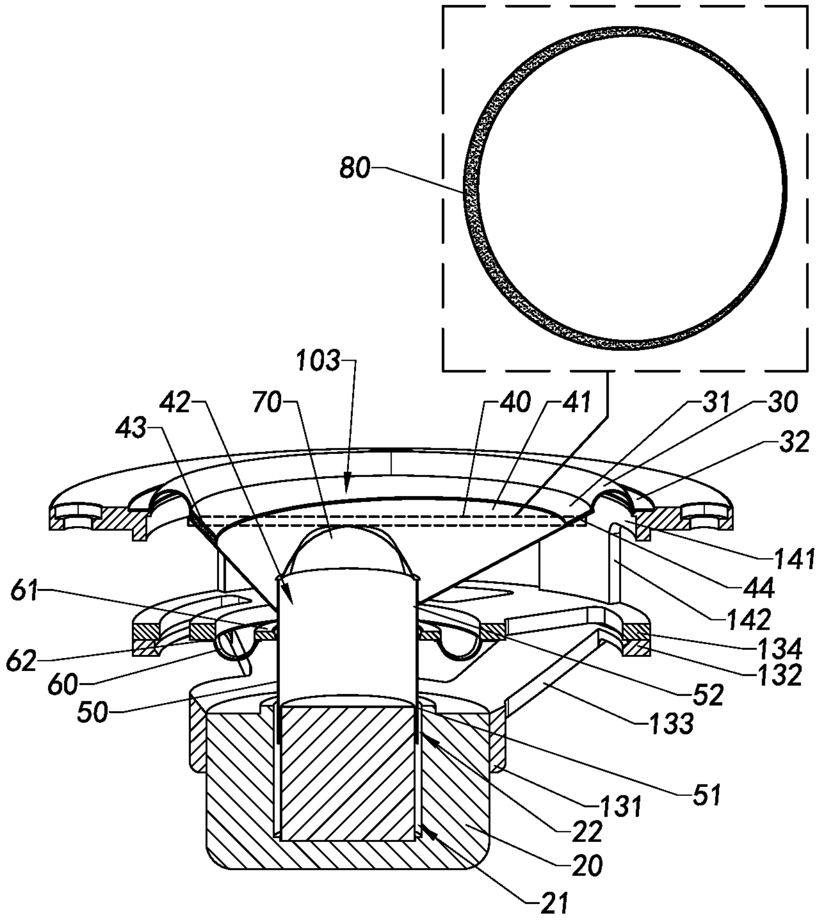
FIG. 13 is a cross-sectional view of a loudspeaker according to a third modified mode of the above preferred embodiment of the present invention.
Figure 14:
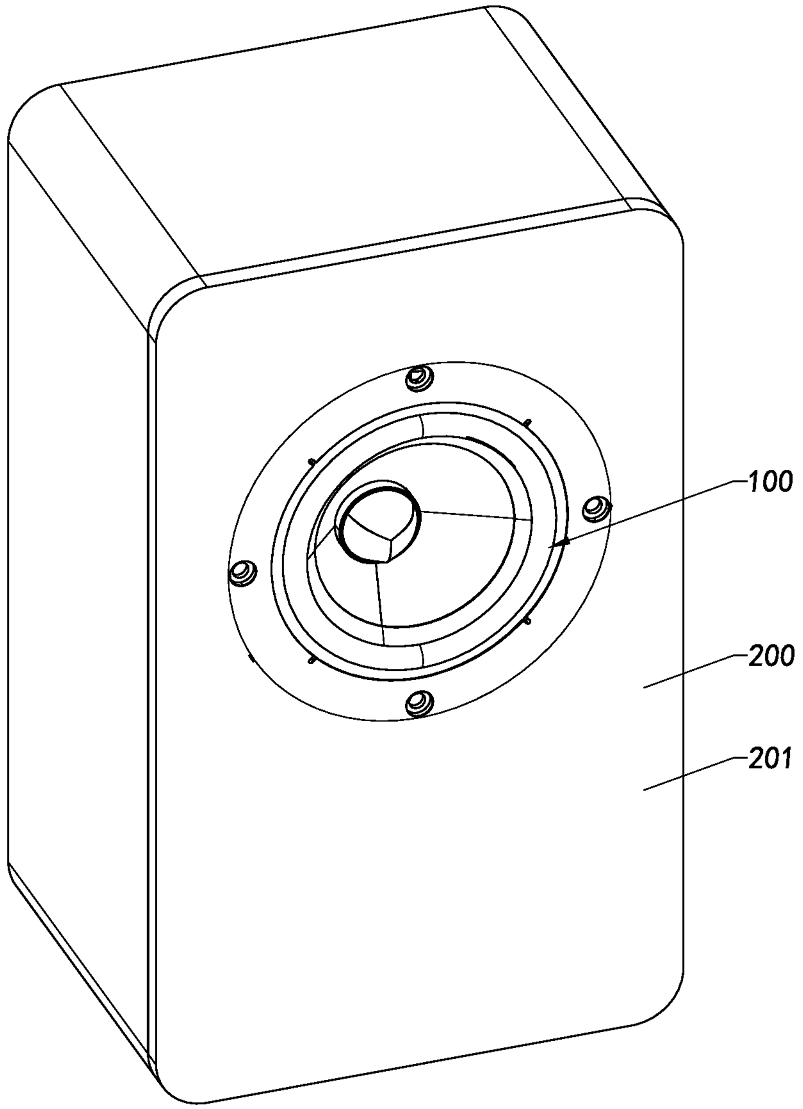
FIG. 14 is a perspective view of a loudspeaker device according to a preferred embodiment of the present invention.
Figure 15:
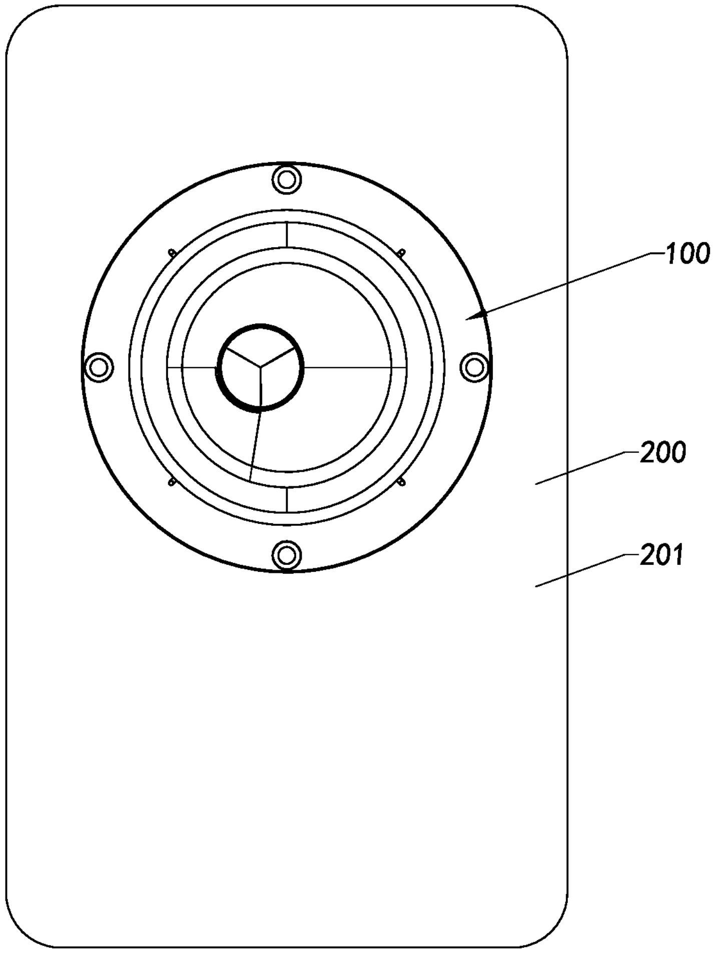
FIG. 15 is a front view of the loudspeaker device according to the above preferred embodiment of the present invention.

FIG. 13 shows a loudspeaker 100 according to a third alternative mode of the above preferred embodiment of the present invention, what is different from the loudspeaker 100 shown in FIGS. 7A to 9, according to this alternative mode shown in FIG. 13, the thickness of a paper cone 40 is the same at every position. The loudspeaker further comprises a glue layer 80 attaching the suspension element inner side 31 of the suspension element 30 to a paper cone outer side 41 of the paper cone 40, wherein the thickness of the glue layer 80 gradually becomes thinner from an axis-near position 43 to an axis-far position 44 of the paper cone 40, so that the center of gravity of a vibration mechanism 103 formed by the suspension element 30, the paper cone 40 and the glue layer 80 is close to the axis-near position 43 of the paper cone 40 and away from the axis-far position 44, so that a moving axis 102 of the loudspeaker 100 can pass through a center position of the vibration mechanism 103. Hence, when the voice coil 50 drives the paper cone 40 to reciprocate along the moving axis 102 of the loudspeaker 100, the paper cone 40 can be kept horizontal and avoid tilting, so as to ensure the sound quality of the loudspeaker 100.

It is worth mentioning that, in the specific embodiment shown in FIG. 13, the paper cone 40 can be made by injection molding process, or can be made by bending a flat structure and bonding the free end of the flat structure, wherein the suspension element 30 needs to be prefabricated.

According to another aspect of the present invention, the present invention further provides an assembling method of the loudspeaker 100, wherein the assembling method comprises the following steps:

(a) installing the magnetic circuit system 20 to the magnetic circuit mounting ring 131 of the lower end frame 13 in such a manner that the central axis of the magnetic circuit system 20 deviates from the central axis of the coupling ring 132 of the lower end frame 13;

(b) allowing the suspension element inner side 31 and the suspension element outer side 32 of the suspension element 30 to be connected to the paper cone outer side 41 of the paper cone 40 and the retaining ring 141 of the upper end frame 14 respectively; and (c) installing the upper end frame 14 to the lower end frame 13 in such a manner that the central axis of the retaining ring 141 and the central axis of the engaging ring 132 coincide with each other, so that the voice coil 50 connected to the induced position 42 of the paper cone 40 is extended toward the magnetic circuit system 20 and is magnetically coupled with the magnetic circuit system 20, and the induced position 42 of the paper cone 40 is deviated from the central axis 101 of the loudspeaker 100, so as to assemble the loudspeaker 100.

According an embodiment of the present invention, the step (b) further comprises the following steps:

forming the paper cone 40 by injection molding, so that the thickness of the paper cone 40 gradually becomes thinner from the axis-near position 43 to the axis-far position 44 of the paper cone 40; and integrally forming the suspension element 30 between the paper cone 40 and the retaining ring 141 of the upper end frame 14.

According another embodiment of the present invention, the step (b) further comprises the following step:

integrally forming the suspension element 30 between the paper cone 40 and the retaining ring 141 of the upper end frame 14, wherein the thickness of the suspension element 30 is gradually becoming thinner from the position corresponding to the axis-near position 43 of the paper cone 40 to the position corresponding to the axis-far position 44 of the paper cone 40.

According another embodiment of the present invention, the step (b) further comprises the following steps:

applying a first glue to the suspension element inner side 31 of the suspension element 30 and/or the paper cone outer side 41 of the paper cone 40, so as to bond the suspension element inner side 31 of the suspension element 30 to the paper cone outer side 41 of the paper cone 40, wherein the thickness of the glue layer 80 retained between the paper cone outer side 41 of the paper cone 40 and the suspension element inner side 31 of the suspension element 30 gradually becomes thinner from the axis-near position 43 to the axis-far position 44 of the paper cone 40; and applying a second glue to the suspension element outer side 32 of the suspension element 30 and/or the retaining ring 141 of the upper end frame 14, so as to bond the suspension element outer side 32 of the suspension element 30 to the retaining ring 141 of the upper end frame 14.

FIGS. 14 to 17C show a loudspeaker device according to a preferred embodiment of the present invention, wherein the loudspeaker device comprises the loudspeaker 100 and a cabinet 200, wherein the cabinet 200 comprises a front baffle 201. The loudspeaker 200 is installed on the front baffle 201 of the cabinet 200.

The induced position 42 of the paper cone 40 of the loudspeaker 100 is deviated from the center axis of the loudspeaker 100. Hence, even the loudspeaker 100 is installed in the middle position of the front baffle 201 of the loudspeaker 100, the cabinet 200 will not be equidistant on two sides of the moving axis 102 of the loudspeaker 100, so as to effectively reduce or even avoid diffracting and further ensure the sound quality of the loudspeaker device. In addition, the loudspeaker device can reduce or even avoid the sound diffraction problem without needing a special designing of the cabinet 200, so that designers who are not familiar with or even have no knowledge of acoustic expertise can easily design and create the loudspeaker device having good sound quality.

Figure 16:
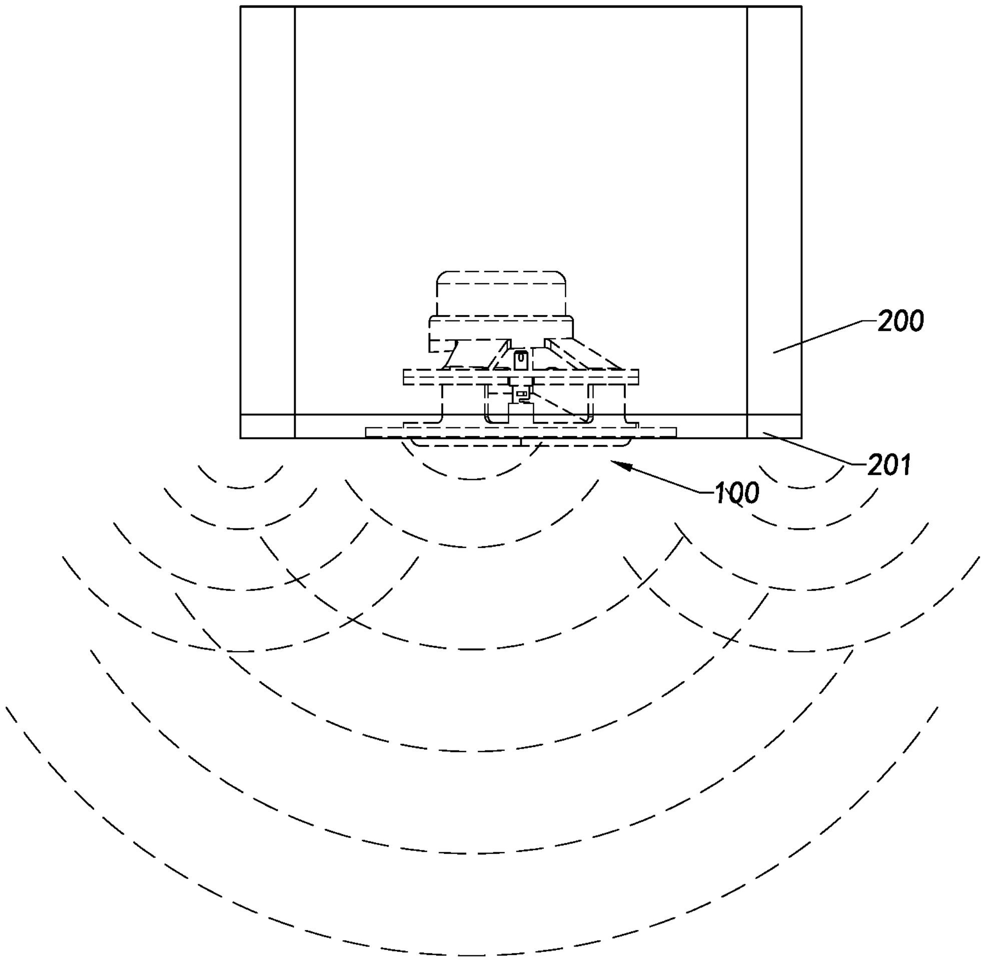
FIG. 16 is a top view of the loudspeaker device according to the above preferred embodiment of the present invention, illustrating the radiation state of sound waves generated by the loudspeaker of the loudspeaker device.
Figure 17A:
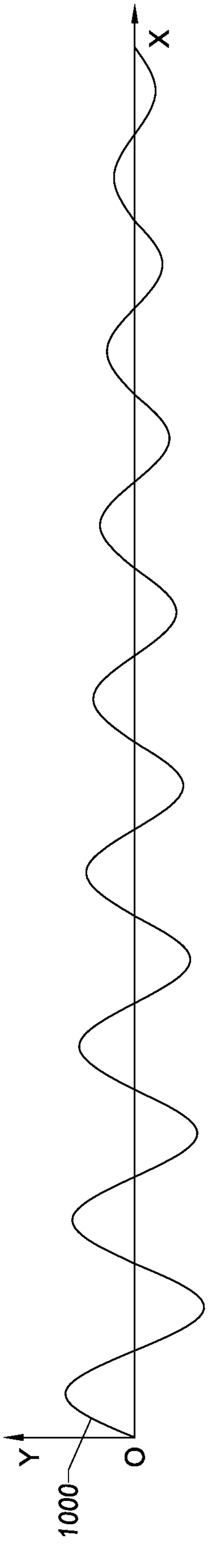
FIGS. 17A to 17C illustrate the sound wave radiation states of the loudspeaker device according to the above preferred embodiment of the present invention.
Figure 17B:
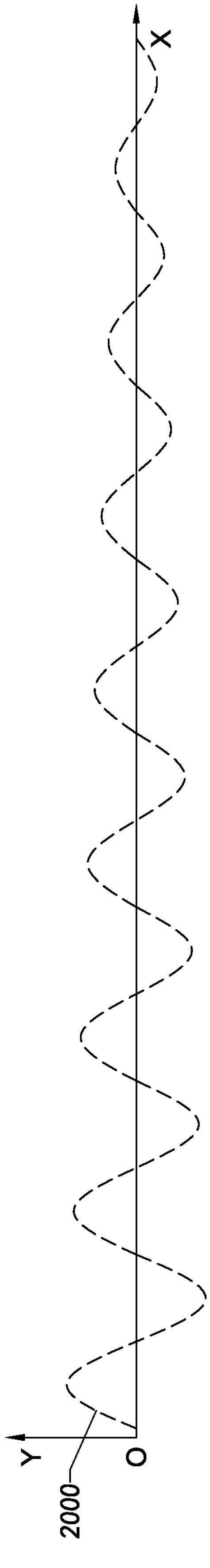
Figure 17C:
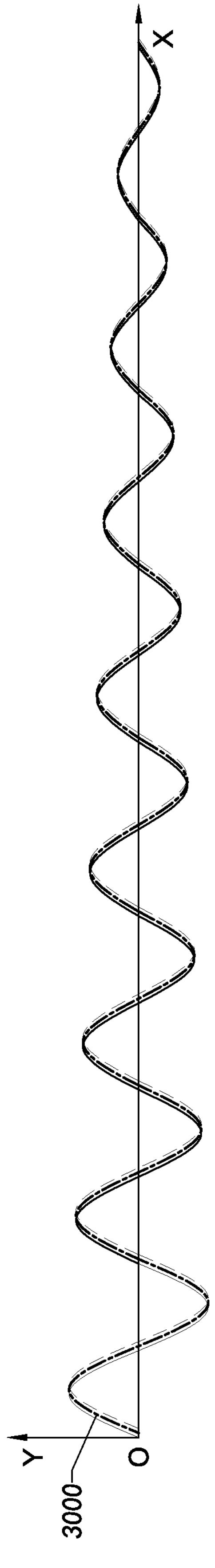

Furthermore, referring to FIGS. 16 to 17C, when the sound waves generated by the loudspeaker 100 are radiated to two sides of the cabinet 200, there is a time difference between the sound waves reach the left edge of the front baffle 201 of the cabinet 200 and the sound waves reach the right edge of the front baffle 201 of the cabinet 200. Hence, when the left reflected sound wave 1000 reflected by the left edge of the front baffle 201 and the right reflected sound wave 2000 reflected by the right edge of the front baffle 201 encounter with each other to form a composite sound wave 3000, the crests and troughs of the left reflected sound wave 1000 and the crests and troughs of the right reflected sound wave 2000 will be staggered to avoid excessive superposition between the left reflected sound wave 1000 and the right reflected sound wave 2000, so as to reduce or even avoid sound diffraction.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention comprises all modifications encompassed within the spirit and scope of the following claims.

What is claimed is:

1. A loudspeaker, comprising:

a magnetic circuit system;

a paper cone having a paper cone outer side;

a suspension element having a suspension element inner side and a suspension element outer side;

a voice coil having a voice coil lower end and a voice coil upper end; and a frame having a frame lower end and a frame upper end, wherein said magnetic circuit system is mounted to said frame lower end of said frame, wherein said suspension element inner side of said suspension element is extended inward to be connected to said paper cone outer side of said paper cone, wherein said suspension element outer side of said suspension element is extended outward to be connected to said frame upper end of said frame, wherein said voice coil upper end is connected to is connected to said paper cone to define an induced position of said paper cone, wherein said voice coil lower end of said voice coil and said magnetic circuit system are magnetically coupled with each other, wherein said induced position of said paper cone deviates from a central axis of said loudspeaker;

wherein said paper cone has an axis-near position and an axis-far position, wherein a thickness of said suspension element gradually becomes thinner from a position of said suspension element corresponding to said axis-near position to another position of said suspension element corresponding to said axis-far position.

2. A loudspeaker, comprising:

a magnetic circuit system;

a paper cone having a paper cone outer side;

a suspension element having a suspension element inner side and a suspension element outer side;

a voice coil having a voice coil lower end and a voice coil upper end;

a frame having a frame lower end and a frame upper end, wherein said magnetic circuit system is mounted to said frame lower end of said frame, wherein said suspension element inner side of said suspension element is extended inward to be connected to said paper cone outer side of said paper cone, wherein said suspension element outer side of said suspension element is extended outward to be connected to said frame upper end of said frame, wherein said voice coil upper end is connected to is connected to said paper cone to define an induced position of said paper cone, wherein said voice coil lower end of said voice coil and said magnetic circuit system are magnetically coupled with each other, wherein said induced position of said paper cone deviates from a central axis of said loudspeaker; and a glue layer attaching said suspension element inner side of said suspension element to said paper cone outer side of said paper cone, wherein a thickness of said glue layer gradually becomes thinner from said axis-near position of said paper cone to said axis-far position of said paper cone.

3. A loudspeaker, comprising:

a magnetic circuit system;

a paper cone having a paper cone outer side;

a suspension element having a suspension element inner side and a suspension element outer side;

a voice coil having a voice coil lower end and a voice coil upper end; and a frame having a frame lower end and a frame upper end, wherein said magnetic circuit system is mounted to said frame lower end of said frame, wherein said suspension element inner side of said suspension element is extended inward to be connected to said paper cone outer side of said paper cone, wherein said suspension element outer side of said suspension element is extended outward to be connected to said frame upper end of said frame, wherein said voice coil upper end is connected to is connected to said paper cone to define an induced position of said paper cone, wherein said voice coil lower end of said voice coil and said magnetic circuit system are magnetically coupled with each other, wherein said induced position of said paper cone deviates from a central axis of said loudspeaker;

wherein said paper cone has an axis-near position and an axis-far position, wherein a thickness of said paper cone gradually becomes thinner from said axis-near position to said axis-far position, wherein a thickness of said suspension element gradually becomes thinner from a position of said suspension element corresponding to said axis-near position to another position of said suspension element corresponding to said axis-far position.

4. The loudspeaker, as recited in claim 3, wherein said paper cone and said suspension element are integrally formed.

5. A loudspeaker, comprising:

a magnetic circuit system;

a paper cone having a paper cone outer side;

a suspension element having a suspension element inner side and a suspension element outer side;

a voice coil having a voice coil lower end and a voice coil upper end; and a frame having a frame lower end and a frame upper end, wherein said magnetic circuit system is mounted to said frame lower end of said frame, wherein said suspension element inner side of said suspension element is extended inward to be connected to said paper cone outer side of said paper cone, wherein said suspension element outer side of said suspension element is extended outward to be connected to said frame upper end of said frame, wherein said voice coil upper end is connected to is connected to said paper cone to define an induced position of said paper cone, wherein said voice coil lower end of said voice coil and said magnetic circuit system are magnetically coupled with each other, wherein said induced position of said paper cone deviates from a central axis of said loudspeaker;

wherein said frame comprises a lower end frame and an upper end frame mounted to said lower end frame, wherein said lower end frame further comprises a magnetic circuit mounting ring, an engaging ring, and a plurality of connecting arms spacedly extended between said magnetic circuit mounting ring and said engaging ring, wherein a central axis of said magnetic circuit system and a central axis of said engaging ring deviate from each other, wherein said magnetic circuit system is mounted to said magnetic circuit mounting ring, wherein said upper end frame comprises a retaining ring and at least two engaging arms extended downward from said retaining ring, wherein said suspension element outer side of said suspension element is connected to said retaining ring of said upper end frame, wherein said at least two engaging arms of said upper end frame is mounted to said engaging ring of said lower end frame, wherein a central axis of said retaining ring and said central axis of said engaging ring coincide with each other.

6. A loudspeaker device, comprising a cabinet and a loudspeaker, wherein said cabinet comprises a front baffle, wherein said loudspeaker is mounted to said front baffle of said cabinet, wherein said loudspeaker comprises:

a magnetic circuit system;

a paper cone having a paper cone outer side;

a suspension element having a suspension element inner side and a suspension element outer side;

a voice coil having a voice coil lower end and a voice coil upper end; and a frame having a frame lower end and a frame upper end, wherein said magnetic circuit system is mounted to said frame lower end of said frame, wherein said suspension element inner side of said suspension element is extended inward to be connected to said paper cone outer side of said paper cone, wherein said suspension element outer side of said suspension element is extended outward to be connected to said frame upper end of said frame, wherein said voice coil upper end is connected to said paper cone to define an induced position of said paper cone, wherein said voice coil lower end of said voice coil and said magnetic circuit system connect with each other in such a manner that said voice coil lower end of said voice coil and said magnetic circuit system magnetically interact with each other, wherein said induced position of said paper cone deviate to a central axis of said loudspeaker;

wherein said paper cone has an axis-near position and an axis-far position, wherein a thickness of said suspension element gradually becomes thinner from a position of said suspension element corresponding to said axis-near position to another position of said suspension element corresponding to said axis-far position.

7. A loudspeaker device, comprising a cabinet and a loudspeaker, wherein said cabinet comprises a front baffle, wherein said loudspeaker is mounted to said front baffle of said cabinet, wherein said loudspeaker comprises:

a magnetic circuit system:

a paper cone having a paper cone outer side;

a suspension element having a suspension element inner side and a suspension element outer side;

a voice coil having a voice coil lower end and a voice coil upper end; and a frame having a frame lower end and a frame upper end, wherein said magnetic circuit system is mounted to said frame lower end of said frame, wherein said suspension element inner side of said suspension element is extended inward to be connected to said paper cone outer side of said paper cone, wherein said suspension element outer side of said suspension element is extended outward to be connected to said frame upper end of said frame, wherein said voice coil upper end is connected to said paper cone to define an induced position of said paper cone, wherein said voice coil lower end of said voice coil and said magnetic circuit system connect with each other in such a manner that said voice coil lower end of said voice coil and said magnetic circuit system magnetically interact with each other, wherein said induced position of said paper cone deviate to a central axis of said loudspeaker;

wherein said loudspeaker further comprises a glue layer attaching said suspension element inner side of said suspension element to said paper cone outer side of said paper cone, wherein a thickness of said glue layer gradually becomes thinner from said axis-near position of said paper cone to said axis-far position of said paper cone.

8. A loudspeaker device, comprising a cabinet and a loudspeaker, wherein said cabinet comprises a front baffle, wherein said loudspeaker is mounted to said front baffle of said cabinet, wherein said loudspeaker comprises:

a magnetic circuit system;

a paper cone having a paper cone outer side;

a suspension element having a suspension element inner side and a suspension element outer side:

a voice coil having a voice coil lower end and a voice coil upper end; and a frame having a frame lower end and a frame upper end, wherein said magnetic circuit system is mounted to said frame lower end of said frame, wherein said suspension element inner side of said suspension element is extended inward to be connected to said paper cone outer side of said paper cone, wherein said suspension element outer side of said suspension element is extended outward to be connected to said frame upper end of said frame, wherein said voice coil upper end is connected to said paper cone to define an induced position of said paper cone, wherein said voice coil lower end of said voice coil and said magnetic circuit system connect with each other in such a manner that said voice coil lower end of said voice coil and said magnetic circuit system magnetically interact with each other, wherein said induced position of said paper cone deviate to a central axis of said loudspeaker;

wherein said paper cone has an axis-near position and an axis-far position, wherein a thickness of said paper cone gradually becomes thinner from said axis-near position to said axis-far position, wherein a thickness of said suspension element gradually becomes thinner from a position of said suspension element corresponding to said axis-near position to another position of said suspension element corresponding to said axis-far position.

9. A loudspeaker device, comprising a cabinet and a loudspeaker, wherein said cabinet comprises a front baffle, wherein said loudspeaker is mounted to said front baffle of said cabinet, wherein said loudspeaker comprises:

a magnetic circuit system;

a paper cone having a paper cone outer side;

a suspension element having a suspension element inner side and a suspension element outer side;

a voice coil having a voice coil lower end and a voice coil upper end; and a frame having a frame lower end and a frame upper end, wherein said magnetic circuit system is mounted to said frame lower end of said frame, wherein said suspension element inner side of said suspension element is extended inward to be connected to said paper cone outer side of said paper cone, wherein said suspension element outer side of said suspension element is extended outward to be connected to said frame upper end of said frame, wherein said voice coil upper end is connected to said paper cone to define an induced position of said paper cone, wherein said voice coil lower end of said voice coil and said magnetic circuit system connect with each other in such a manner that said voice coil lower end of said voice coil and said magnetic circuit system magnetically interact with each other, wherein said induced position of said paper cone deviate to a central axis of said loudspeaker;

wherein said frame comprises a lower end frame and an upper end frame mounted to said lower end frame, wherein said lower end frame further comprises a magnetic circuit mounting ring, an engaging ring, and a plurality of connecting arms spacedly extended between said magnetic circuit mounting ring and said engaging ring, wherein a central axis of said magnetic circuit system and a central axis of said engaging ring deviate from each other, wherein said magnetic circuit system is mounted to said magnetic circuit mounting ring, wherein said upper end frame comprises a retaining ring and at least two engaging arms extended downward from said retaining ring, wherein said suspension element outer side of said suspension element is connected to said retaining ring of said upper end frame, wherein said at least two engaging arms of said upper end frame is mounted to said engaging ring of said lower end frame, wherein a central axis of said retaining ring and said central axis of said engaging ring coincide with each other.

10. A method for assembling a loudspeaker, comprising the following steps:

(a) installing a magnetic circuit system to a magnetic circuit mounting ring of a lower end frame in such a manner that a central axis of said magnetic circuit system deviates from a central axis of an engaging ring of said lower end frame;

(b) allowing a suspension element inner side and a suspension element outer side of a suspension element to be connected to a paper cone outer side of a paper cone and a retaining ring of an upper end frame respectively; and (c) installing said upper end frame to said lower end frame in such a manner that a central axis of said retaining ring and a central axis of said engaging ring coincide with each other, so as to allow a voice coil which is connected to an induced position of said paper cone to be extended toward said magnetic circuit system and is magnetically coupled to said magnetic circuit system, and said induced position of said paper cone is deviated from a central axis of said loudspeaker, so as to assemble said loudspeaker.

11. The method, as recited in claim 10, wherein the step (b) further comprises the following steps:

forming said paper cone by injection molding, wherein a thickness of said paper cone gradually becomes thinner from an axis-near position to an axis-far position of said paper cone; and integrally forming said suspension element between said paper cone and said retaining ring of said upper end frame.

12. The method, as recited in claim 10, wherein the step (b) further comprises a following step:

integrally forming said suspension element between said paper cone and said retaining ring of said upper end frame, wherein a thickness of said suspension element is gradually thinner from a position corresponding to an axis-near position of said paper cone to another position corresponding to an axis-far position of said paper cone.

13. The method, as recited in claim 10, wherein the step (b) further comprises the following steps:

applying a first glue between said suspension element inner side of said suspension element and said paper cone outer side of said paper cone, so as to bond said suspension element inner side of said suspension element to said paper cone outer side of said paper cone, wherein a thickness of a first glue layer retained between said paper cone outer side of said paper cone and said suspension element inner side of said suspension element gradually becomes thinner from an axis-near position to an axis-far position of said paper cone; and applying a second glue between said suspension element outer side of said suspension element and said retaining ring of said upper end frame, so as to bond said suspension element outer side of said suspension element to said retaining ring of said upper end frame.

14. The method, as recited in claim 10, wherein the step (b) further comprises a following step:

integrally forming said paper cone and said suspension element by injection molding, wherein said suspension element outer side of said suspension element is integrally connected to said retaining ring of said upper end frame, wherein a thickness of said paper cone gradually becomes thinner from an axis-near position to an axis-far position of said paper cone, wherein a thickness of said suspension element gradually becomes thinner from a position corresponding to said axis-near position of said paper cone to another position corresponding to said axis-far position of said paper cone.

* * * * *